(12) United States Patent
Okazaki

(10) Patent No.: US 7,415,141 B2
(45) Date of Patent: Aug. 19, 2008

(54) SIGNATURE AUTHENTICATION DEVICE, SIGNATURE AUTHENTICATION METHOD, AND COMPUTER PROGRAM PRODUCT

(75) Inventor: Masaru Okazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 893 days.

(21) Appl. No.: 10/987,008

(22) Filed: Nov. 15, 2004

(65) Prior Publication Data

US 2005/0091500 A1    Apr. 28, 2005

Related U.S. Application Data

(62) Division of application No. 09/722,703, filed on Nov. 28, 2000, now abandoned.

(30) Foreign Application Priority Data

Nov. 30, 1999 (JP) ............................. 11-339999
Nov. 30, 1999 (JP) ............................. 11-340001

(51) Int. Cl.
  *G06K 9/00* (2006.01)
  *G06K 9/03* (2006.01)
(52) U.S. Cl. ............... 382/119; 382/187; 382/311; 73/865.4; 178/18.01
(58) Field of Classification Search ......... 382/119–123, 382/187–189, 309–311; 73/865.4; 178/18.01; 348/161
  See application file for complete search history.

(56) References Cited

U.S. PATENT DOCUMENTS

| | | | |
|---|---|---|---|
| 4,724,542 A | 2/1988 | Williford | 382/3 |
| 5,422,959 A | 6/1995 | Lee | 382/119 |
| 5,479,530 A * | 12/1995 | Nair et al. | 382/119 |
| 5,544,255 A | 8/1996 | Smithies et al. | 382/119 |
| 5,559,897 A | 9/1996 | Brown et al. | 382/186 |
| 5,647,017 A | 7/1997 | Smithies et al. | 382/119 |
| 5,892,824 A | 4/1999 | Beatson et al. | 380/25 |
| 5,974,161 A * | 10/1999 | York | 382/119 |
| 6,157,731 A | 12/2000 | Hu et al. | 382/119 |
| 6,236,740 B1 | 5/2001 | Lee | 382/119 |
| 6,396,950 B1 * | 5/2002 | Arai et al. | 382/181 |
| 6,453,070 B1 | 9/2002 | Seni et al. | 382/187 |
| 7,095,909 B1 * | 8/2006 | Beasley | 382/314 |

* cited by examiner

*Primary Examiner*—Aaron W Carter
(74) *Attorney, Agent, or Firm*—Fitzpatrick, Cella, Harper & Scinto

(57) ABSTRACT

A signature authentication device is disclosed. Even when there are variations in an input hand-written signature during the registration of the signature or during the authentication of the signature, the signature authentication device easily registers or authenticates the signature. The signature authentication device allows a user to re-register the signature without a risk that sensitive information stored in a computer is monitored by someone else. A plurality of pieces of authentication signature data for a single user is stored. If comparison for authentication between input signature data and at least a single piece of the plurality of the pieces of the authentication signature data is successful, then the authentication is regarded as successful. During signature registration, the plurality of the pieces of the authentication signature data is stored in a storage unit. The signature authentication device determines whether a predetermined startup unit from among a plurality of startup units for starting up the hand-written signature authentication device has started up the signature authentication device, and deletes the signature information and user information when it is determined that the device is started up by the predetermined startup unit.

21 Claims, 12 Drawing Sheets

SIGNATURE REGISTRATION

SIGNATURE AUTHENTICATION

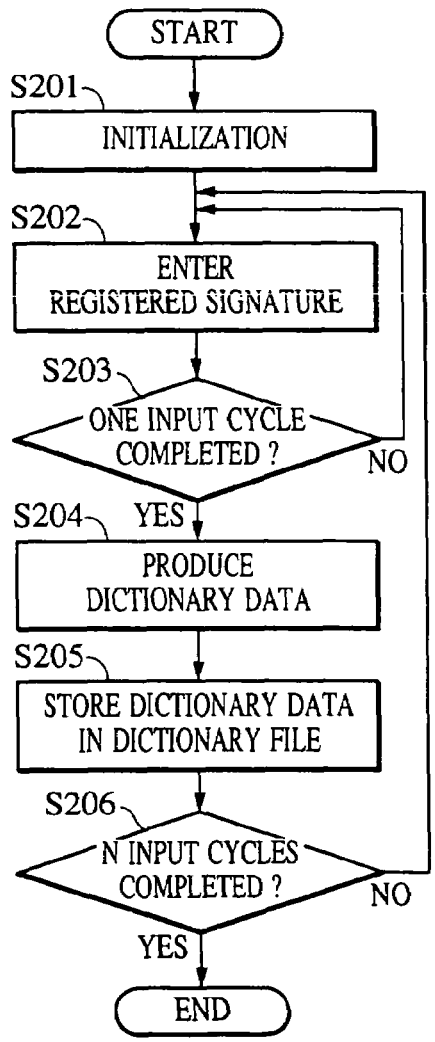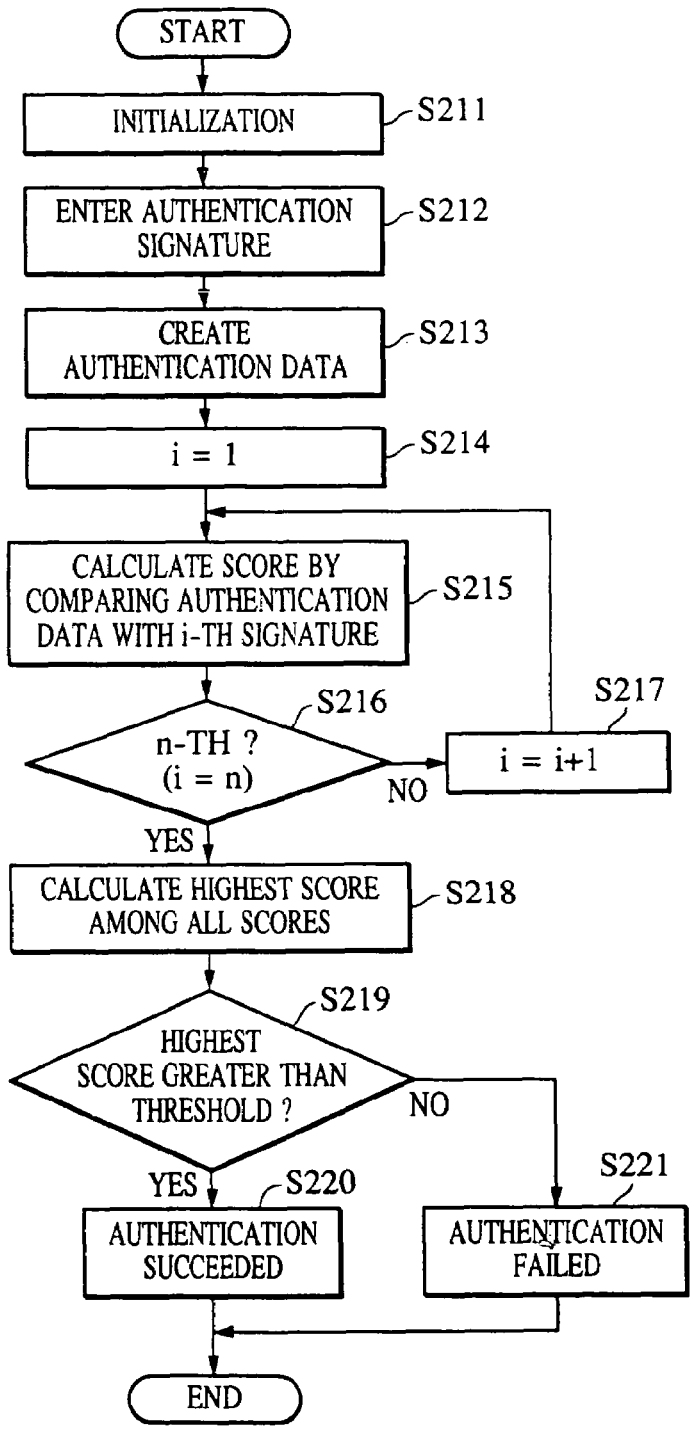
FIG. 2A
REGISTRATION
FIG. 2B
AUTHENTICATION

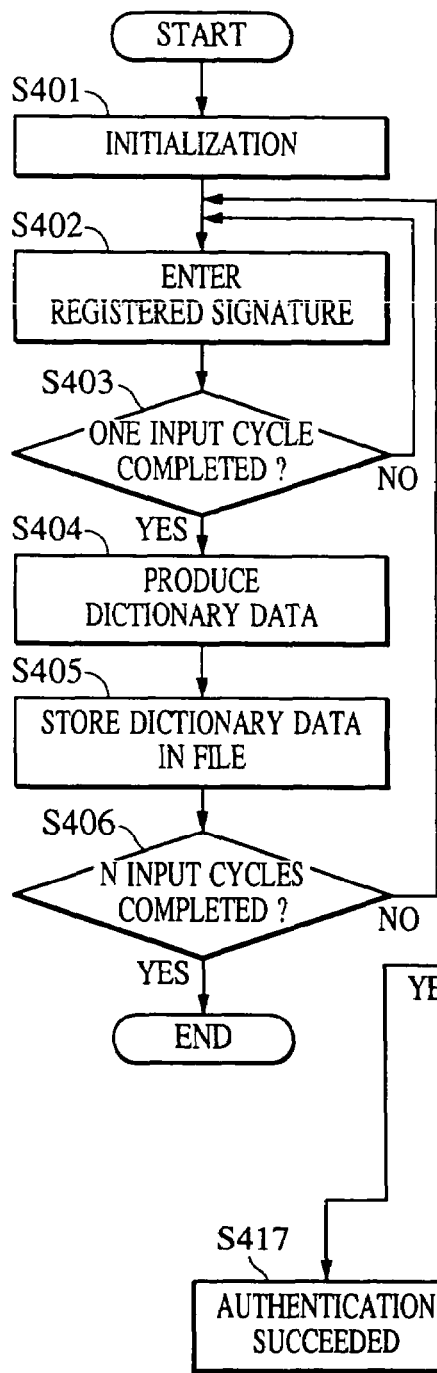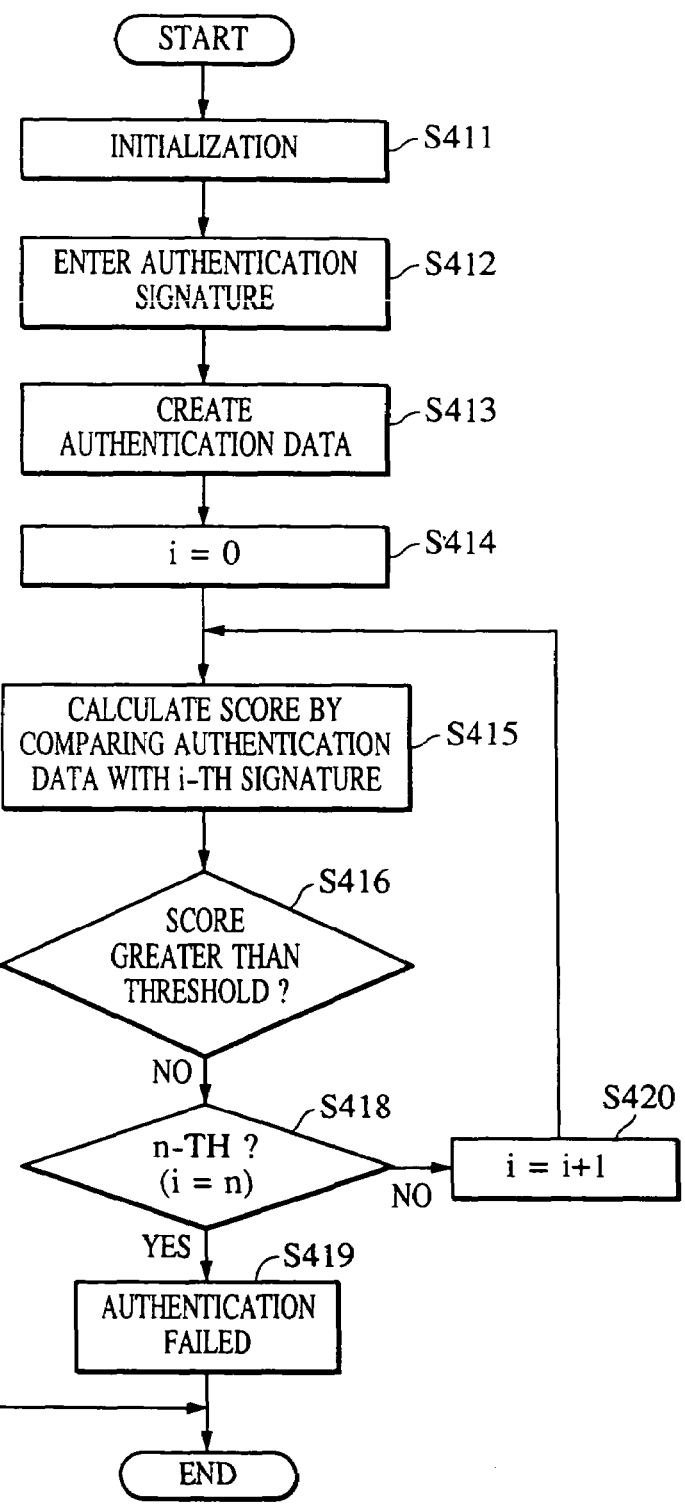

FIG. 5A
REGISTRATION
FIG. 5B
AUTHENTICATION
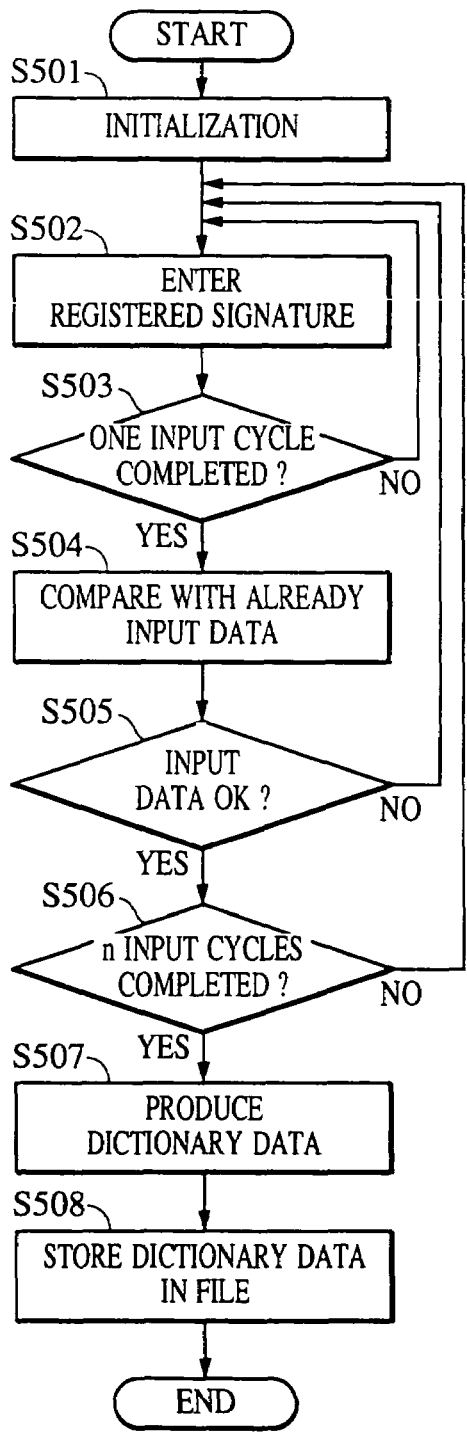
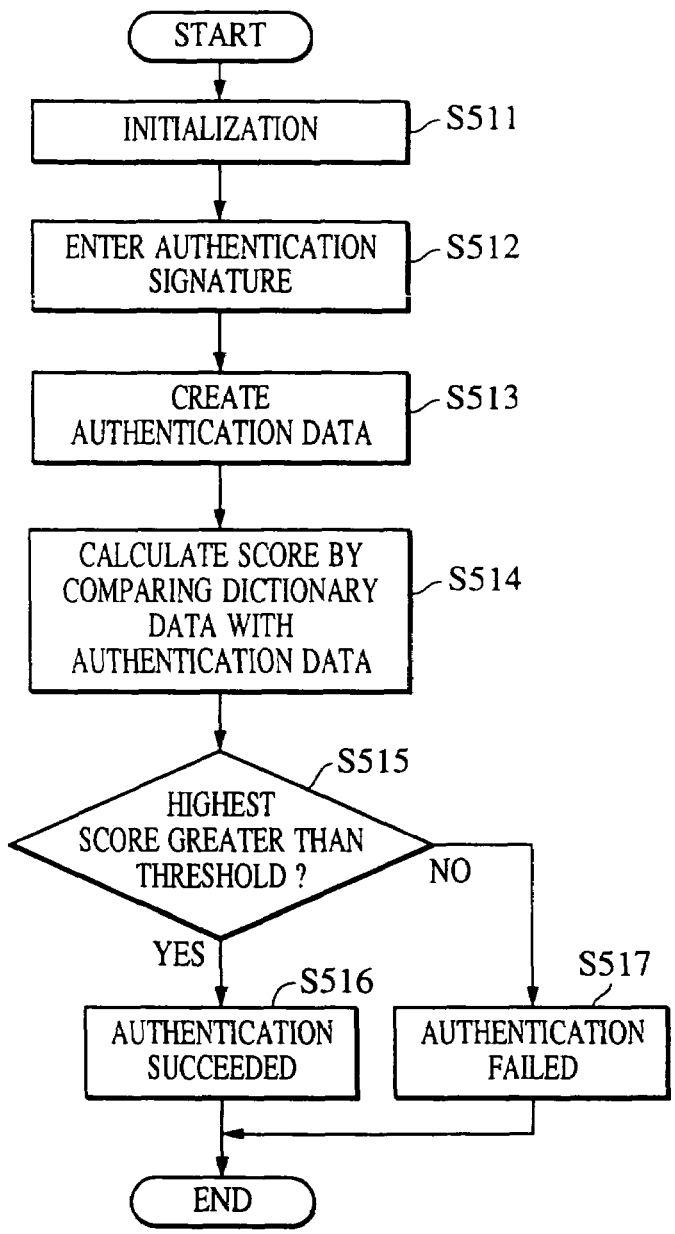
PRIOR ART

FIG. 6A
[ FRONT ]
FIG. 6B
[ BACK ]
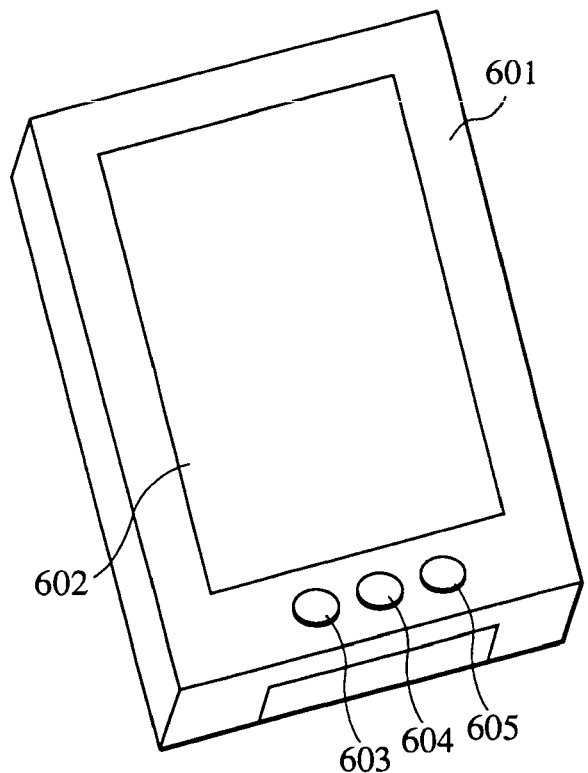
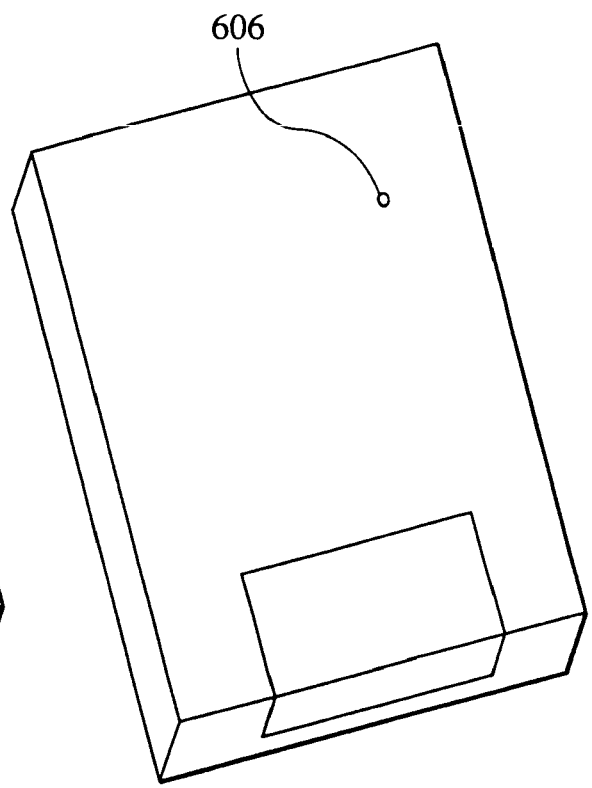

SIGNATURE AUTHENTICATION DEVICE, SIGNATURE AUTHENTICATION METHOD, AND COMPUTER PROGRAM PRODUCT

This application is a division of application Ser. No. 09/722,703 filed Nov. 28, 2000, now abandoned.

BACKGROUND OF THE INVENTION

1. Field of the Invention

The present invention relates to a signature authentication device, a signature authentication method, and a computer program product for authenticating the identity of a true user by receiving a signature from the user.

2. Description of the Related Art

A signature hand-written by a person has been used as means for identifying the person for a long time. Recently, besides authentication means for identifying a person who uses a password on a computer, techniques are contemplated to identify the person by authenticating an input hand-written signature.

Hand-written signature authentication is typically used to permit only a person himself or herself to monitor or over-write sensitive information written in a portable terminal such as a computer.

To authenticate a hand-written signature on a computer, for instance, a signature is input using a digitizer and a pen, and input coordinates, input time, and pen force are converted into electrical signals as computer-readable data. A computer then compares the data with hand-written signature data of the person already registered in a dictionary, calculates a score indicating a difference between the input hand-written signature data and the registered hand-written signature data, and identifies the person by referring to whether the score exceeds a predetermined threshold.

To pre-register data for use in signature authentication, the computer allows a user to write the user's signature on a digitizer a plurality of times, checks the degree of similarity between the plurality of signatures, produces a single piece of dictionary data based on the signatures similar to each other to some degree, and registers the data.

In one method of registration, a single signature selected from among the plurality of the input signatures is registered or in the other method of registration, the plurality of the input signatures are averaged and the average value is registered.

FIGS. 5A and 5B show registration and authentication processes of a signature in a conventional hand-written signature authentication device. FIG. 5A is a flow diagram for registering a signature in a dictionary in the hand-written signature authentication device, and FIG. 5B is a flow diagram for authentication of the signature.

The signature registration process is now discussed.

In step S501, a buffer for storing the trace of the handwriting on a digitizer and variables are initialized. The device waits for a signature input in step S502.

One signature is input and hand-written data is stored in step S503, and when the input cycle is complete, the process goes to step S504.

If the newly input signature is at least the second input signature, then in step S504 the newly input hand-written signature is compared with the already input signatures for matching.

If the input signatures are determined to be similar in step S505, then the process goes to step S506 assuming that the signature input at this time is complete.

If the device detects no similarity between the input signatures, then in step S505, the process loops back to step S502, prompting the user to input the signature again.

If the device determines in step S506 that a predetermined number of cycles (n cycles) from step S502 through step S505 has been completed, then the process goes to step S507. The device produces dictionary data to be referenced for the hand-written signature in step S507 and stores the dictionary data in a file in step S508. When it is determined in step S506 that the n cycles have not yet been completed, the process loops back to step S502 for further signature input.

The authentication process during authentication is now discussed.

The buffer and variables are initialized in step S511 and the device waits for the input of an authentication signature in step S512.

When the device detects the end of the input of the signature, authentication data is produced in step S513. The process goes to step S514.

In step S514, the device compares the reference dictionary data stored in the dictionary with the authentication data, thereby calculating a score indicating the degree of similarity.

If the score calculated in step S514 is higher than a score threshold predetermined in the hand-written signature authentication device in step S515, the process goes to step S516. The authentication is thus successful. If the calculated score is lower than the score threshold, the process goes to step S517. The authentication is thus unsuccessful.

The conventional methods have disadvantages when there are large variations in the hand-written signatures during the signature registration in the above device, the signature authentication device detects no similarity between the signatures, and prompts the user to sign repeatedly thereon. This inconveniences the user, and large variations in the handwriting may require endless registration cycles.

SUMMARY OF THE INVENTION

Accordingly, it is an object of the present invention to lighten the inconvenience imposed on a user when a user must repeatedly input a signature for registration because of variations in the hand-written signatures.

It is another object of the present invention to allow signature authentication to be performed even when there are variations in the input hand-written signatures during signature authentication.

The function of re-registering the signature to reuse a terminal is required when the signature data of the registered dictionary data is lost through a device failure, or when the user forgets the registered signature, leading to an unsuccessful signature authentication. However, if the re-registration of the signature is easy, there is a risk that someone else registers a signature, and monitors sensitive information in the portable information terminal. It is another object of the present invention to allow the user to re-register without the risk of someone else monitoring the sensitive information stored in the portable information terminal such as a computer.

In a signature authentication device, a signature authentication method and a storage medium storing a signature authentication program, of the present invention, authentication is deemed successful if a comparison between input signature data and at least one piece of a plurality of authentication signature data is successful.

In accordance with the above objects, one aspect of the present invention relates to a signature authentication device and includes storage means for storing a plurality of pieces of authentication signature data for one single user, input means for inputting signature data, and authenticator means for determining that the input signature data is successfully authenticated if a comparison between the input signature data and at least one piece of the plurality of pieces of authentication signature data is successful.

Another aspect of the present invention relates to a signature authentication method that includes an input step of inputting signature data, and an authentication step of determining that the input signature data is successfully authenticated when a comparison between the input signature data and at least one piece of a plurality of pieces of authentication signature data is successful.

Yet another aspect of the present invention relates to a computer-readable computer program product for authenticating a signature and includes computer-executable code for performing an input step of inputting signature data, and an authentication step of determining that the input signature data is successfully authenticated if a comparison between the input signature data and at least one piece of a plurality of pieces of authentication signature data is successful.

Still another aspect of the present invention relates to a signature authentication device and includes storage means for storing user information and signature information for authenticating a signature input through hand-writing, a plurality of startup means for starting up the signature authentication device, startup determination means for determining whether predetermined startup means from among the plurality of startup means has performed a startup, and deleting means for deleting the signature information and the user information when it is determined that the startup has been performed by the predetermined startup means.

Yet another aspect of the present invention relates to a signature authentication method for controlling a signature authentication device having storage means for storing user information and signature information for authenticating a signature input through hand-writing and having a plurality of startup means for starting the signature authentication device. The method includes a startup determination step of determining whether a startup has been performed by predetermined startup means from among the plurality of startup means, and a deleting step of deleting the signature information and the user information when it is determined in the startup determination step that the startup has been performed by the predetermined startup means.

Another aspect of the present invention relates to a computer-readable computer program product for controlling a signature authentication device having storage means for storing user information and signature information for authenticating a signature input through hand-writing and having a plurality of startup means for starting the signature authentication device. The computer program product includes computer-executable code for performing a startup determination step of determining whether a startup has been performed by predetermined startup means from among the plurality of startup means, and a deleting step of deleting the signature information and the user information when it is determined that the startup has been performed by the predetermined startup means in the startup determination step.

Still another aspect of the present invention relates to a signature authentication device and includes a memory storing a plurality of pieces of authentication signature data for one single user, an input device for inputting signature data, and a processor that compares the input signature data with each piece of the plurality of pieces of authentication signature data and determines that the input signature data is successfully authenticated when a comparison between the input signature data and at least one piece of the plurality of pieces of authentication signature data is successful.

Preferably, a score indicating the degree of matching between the input signature data and the authentication signature data is calculated, and the authentication of the input signature is determined based on the calculated score.

Preferably, a score indicating the degree of matching between the input signature data and each of the plurality of the pieces of the authentication signature data is calculated, and the authentication of the input signature is determined based on the highest score from among a plurality of scores.

Preferably, a score indicating the degree of similarity between the input signature data and each of the plurality of the pieces of the authentication signature data is calculated, and a determination is made of whether the authentication of the input signature is successful, based on the calculated score, each time the score is calculated.

Preferably, the authentication of the input signature is performed by comparing the score calculated by a calculator with a score passing the authentication.

Preferably, the authentication of the input signature is deemed unsuccessful when the comparison result between the input signature data and each of the plurality of the pieces of the authentication signature data is unsuccessful.

Preferably, the plurality of the pieces of the authentication signature data is input and then stored in a storage unit.

Preferably, the plurality of the pieces of the authentication signature data is stored in the storage unit by inputting the signatures a plurality of times.

The signature authentication device may be incorporated in a portable information processing device.

Preferably, a determination is made of whether a predetermined startup unit from among a plurality of startup units has performed a startup, and predetermined information is deleted when it is determined that the startup of the device is performed by the predetermined startup unit.

Preferably, a determination is made of whether user information is sensitive information, and the user information, if determined to be sensitive information, is deleted.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are flow diagrams showing in detail the signature registration process and the signature authentication process of the first embodiment;

FIGS. 4A and 4B are flow diagrams showing in detail the signature registration and the signature authentication process of the second embodiment;

FIGS. 5A and 5B are flow diagrams showing the operation of a conventional hand-written signature authentication device;

FIGS. 6A and 6B show a portable information terminal in which the embodiments of the present invention may be implemented;

DESCRIPTION OF THE PREFERRED EMBODIMENTS

First Embodiment

A first embodiment of the present invention is now discussed.

A signature authentication device of the present invention may be incorporated in an information processing apparatus such as a portable information terminal. The signature authentication device of the first embodiment is incorporated in a portable information terminal as shown in FIGS. 6A and 6B. FIG. 6A is a front view of a portable terminal body 601, including a liquid-crystal display unit 602 integrated with a digitizer, and control buttons 603-605. FIG. 6B is a rear view of the portable terminal 601, including a reset button 606. During signature registration and signature authentication, the user signs on the liquid-crystal display unit 602 using a pen and the digitizer converts an input signature into data.

Figure 7:
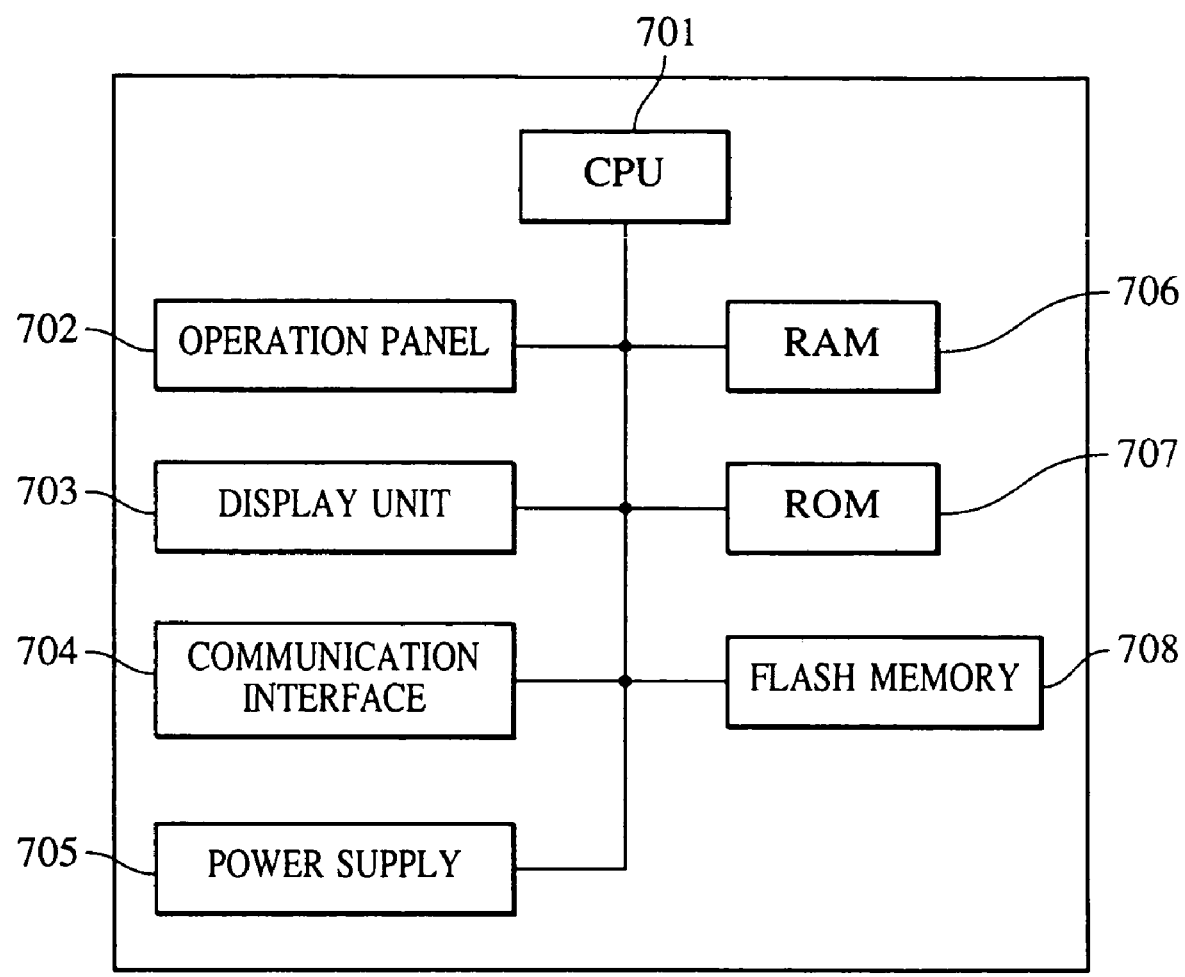
FIG. 7 is a block diagram showing the internal construction of the portable information terminal of an embodiment of the present invention.

FIG. 7 is a block diagram showing the internal construction of the portable information terminal of the first embodiment. As shown, a CPU 701 reads programs such as a signature authentication program or application software, performing processes shown in FIG. 1A through FIG. 2B, from a ROM 707 or a flash memory 708, and executes the program using a RAM 706 as a work area. An operation panel 702 is used by the user to operate the portable information terminal 601, and includes the digitizer and the control buttons 603-605. A display unit 703 controls the liquid-crystal display unit 602 to display information thereon. A communication interface 704 is used to communicate with external devices. A power supply 705 feeds power to the units of the portable information terminal 601. The RAM 706 serves as a work area on which the CPU 701 executes the program. The ROM 707 and the flash memory 708 are storage media which store the program and dictionary data used for authentication.

Figure 1A:
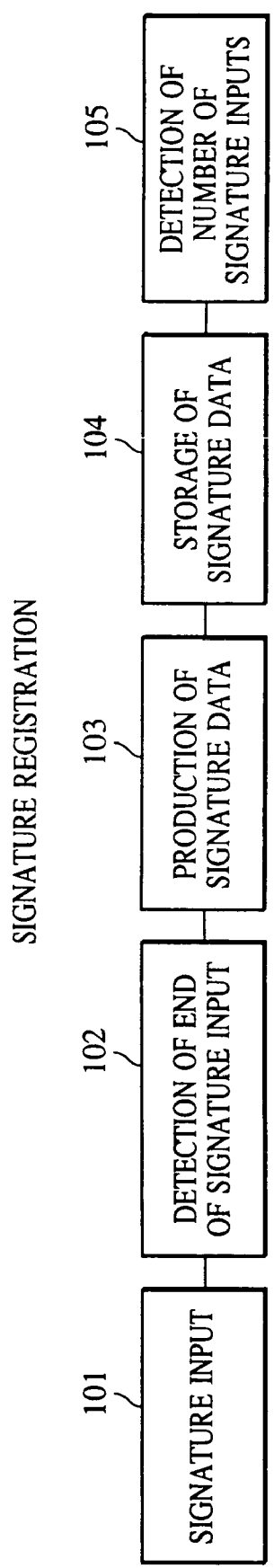
FIGS. 1A and 1B are schematic diagrams showing a signature registration process and a signature authentication process of a first embodiment of the present invention.
Figure 1B:
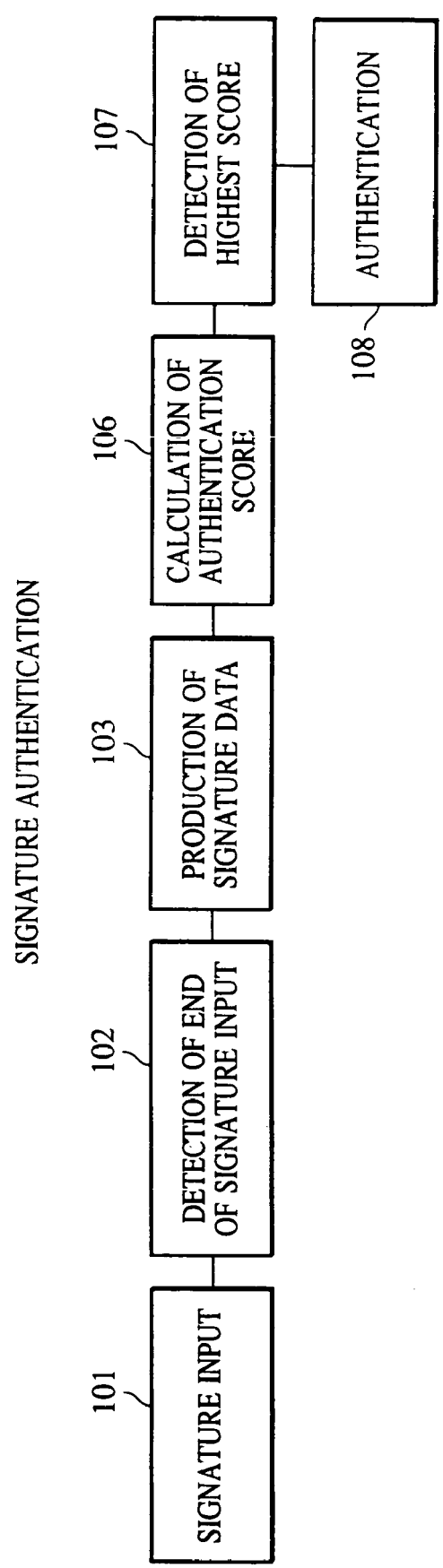

FIGS. 1A and 1B are schematic diagrams showing a signature registration process and a signature authentication process in accordance with the first embodiment. FIG. 1A shows the concept for the signature registration process and FIG. 1B shows the concept for the signature authentication process.

A signature is registered as shown in FIG. 1A.

In a signature input block 101, a hand-written signature is successively sampled at a predetermined sample period to detect coordinates thereof while the user hand-writes the signature, and the signature is thus input to the terminal. A resistor film is glued on the liquid-crystal display unit 602. When a pen is in contact with the resistor film, voltage differences occur in a vertical direction and in a horizontal direction, and the point of contact on the liquid-crystal display screen (coordinates) is detected by detecting the voltage difference at the sample period. If the sample period is short, the hand-written signature that is written on the liquid-crystal display screen using a pen is successively detected.

In a signature input end detection block 102, the end of the signature input is detected. A software button is displayed on the liquid-crystal display screen, and the digitizer recognizes the tapping of the software button when the software button is pressed by the pen. When the input of the signature is not performed for a predetermined duration of time, the terminal may determine that the signature input has ended.

In a signature data production block 103, data input in the signature input block 101 is re-organized in a data structure that is appropriate for signature authentication, and in a signature data storage block 104, the data appropriate for the signature authentication is stored in a dictionary file (in the flash memory 708).

A predetermined number of signature input cycles (n cycles in the first embodiment) is repeated, and thereby n cycles of signature inputs are detected in detection block 105. The signature registration is thus complete.

Figure 8:
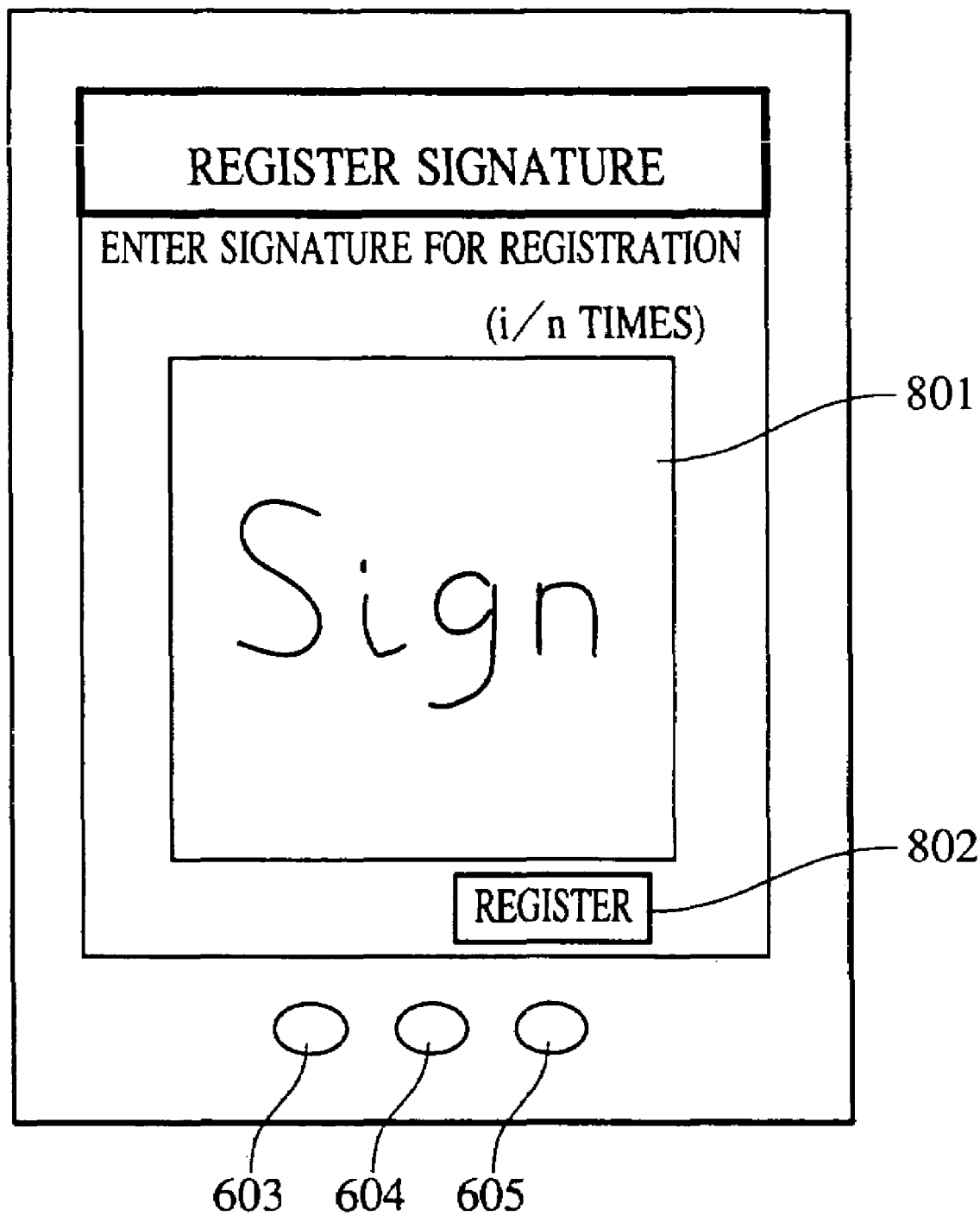
FIG. 8 shows a display screen for signature registration.

FIG. 8 shows a display screen for the signature registration. The display screen presents a signature input area 801 and a software button 802 for starting a registration process when the signature input ends. The user signs on the signature input area 801. FIG. 8 shows the display screen for an i-th signature input cycle of the n signature input cycles.

FIG. 1B diagrammatically shows the signature authentication process.

In a signature input block 101, a hand-written signature is successively sampled at a predetermined sample period to detect coordinates thereof while the user hand-writes the signature, and the signature is thus input to the terminal.

In a signature input end detection block 102, the end of the signature input is detected.

In a signature data production block 103, data input in the signature input block 101 is re-organized in a data structure appropriate for signature authentication.

In an authentication score calculation block 106, the input signature data is compared with signature data (dictionary data) registered in the dictionary, and the degree of similarity is calculated in a score.

In a highest score calculation block 107, the highest score is determined from the scores calculated from a plurality of the signature data.

In an authentication block 108, the signature authentication is performed by determining whether the highest score determined in the highest score calculation block 107 exceeds a predetermined threshold level.

Figure 9:
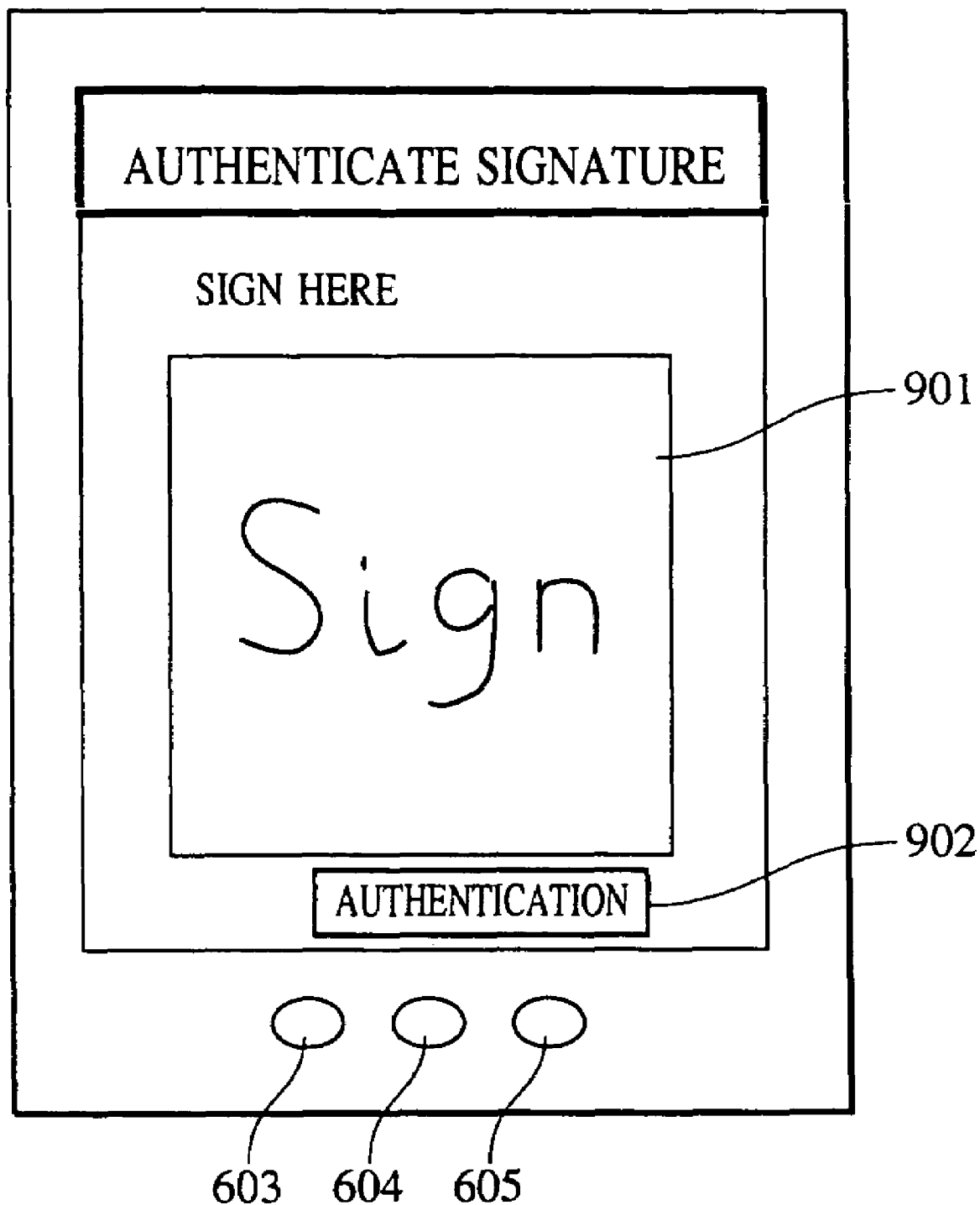
FIG. 9 shows a display screen for signature authentication.

FIG. 9 shows a display screen for the signature authentication. The display screen presents a signature input area 901 and a software button 902 for starting an authentication process when the signature input ends. The user signs on the signature input area 901.

FIGS. 2A and 2B show in detail the process in the first embodiment, wherein FIG. 2A is a flow diagram for the signature registration process and FIG. 2B is a flow diagram for the signature authentication process.

The signature registration process (FIG. 2A) is performed as follows.

In step S201, the device waits for the input of a signature to be registered, with variables used in a buffer initialized.

In step S202, hand-writing data is stored in the buffer when the signature is input.

In step S203, the process goes to step S204 when a single cycle of signature input is complete.

In step S204, data to be stored as a dictionary is produced from the hand-writing data, and is stored in a dictionary file in step S205.

In step 206, when the n cycles of signature inputs are complete, the process ends. Otherwise, the process returns to step S202.

The dictionary file contains data of a plurality of cycles of signature registration (n pieces of data).

The signature authentication (FIG. 2B) is performed as follows.

In step S211, the device waits for a signature input for authentication with variables used in a buffer initialized.

In step S212, the signature for authentication is input.

In step S213, authentication data to be compared with the signature data (dictionary data) registered in the dictionary is produced when the signature input is complete.

In step S214, a variable i is initialized (i=1).

In step S215, the authentication data produced in step S213 is compared with an i-th signature (dictionary data) registered in the dictionary, and a score indicating the degree of similarity (matching) is calculated. To calculate the score, the dictionary data and the authentication data are subjected to DP (Dynamic Programming) matching. When the dictionary contains n pieces of dictionary data (when n signatures are written during registration), the n pieces of dictionary data are compared with the authentication data. In step S216, it is determined whether i equals n. If i does not equal n, then the process proceeds to step S217 where i is incremented by one, and then the process returns to step S215. If i equals n in step S216, then the process proceeds to step S218. The score indicating the degree of similarity is calculated by cycling through steps S215, S216, and S217 n times.

When the comparison with all the dictionary data and the score calculation end, the highest score (hereinafter referred to as P point) is selected from among the n scores calculated, step S218.

In step S219, the P point is compared with the threshold score predetermined in the device to see if the P point is the score having the degree of similarity higher than that of the predetermined score. When the P point is higher in the degree of similarity, the process goes to step S220 where authentication proves successful (the signature matching succeeds). When the P point is lower, the process goes to step S221 where authentication is unsuccessful (the signature matching fails).

As discussed above, the user inputs the signature for a predetermined number of times during the signature registration.

The label "i/n times" shown in FIG. 8 indicates that the i-th registration out of the predetermined number of times n has been performed.

In the conventional art, the user must enter the signature a predetermined number of times during the registration to increase the accuracy of the signature registered and the signature to be authenticated, and if the correlation value of the plurality of the input signatures is not high enough, further signature inputs are required. In the first embodiment, the predetermined number of inputs n is sufficient.

The n cycles of signature inputs accommodate variations therewithin (without taking into consideration the correlation of the signature). When the input signature has a high degree of similarity with any one of the input signatures (dictionary data), which are subject to variations during the authentication, the authentication is deemed successful.

The user does not need to enter inputs having a high correlation during the registration of the signature, and thus enjoys an easy registration environment.

The variations of the signatures registered are assumed, and if the signature input during the authentication has a high correlation with any one of the n registered signatures, the signature input is successfully authenticated. The threshold value serving as a criterion for the determination of successful or unsuccessful authentication is set to be rigorous. Specifically, a permissible range, within which a successful authentication is determined with reference to the dictionary data, is narrowed. The criterion level for authenticating the signature of a person is thus raised for higher accuracy.

Thus, n registered signatures totally different from each other may be employed. The authentication is successfully performed as long as any one of the plurality of the corresponding signatures is input during the authentication.

Second Embodiment

A second embodiment of the present invention is now discussed.

Like the first embodiment, the second embodiment may be incorporated in the information processing apparatus such as the portable information terminal shown in FIGS. 6A and 6B and FIG. 7.

The second embodiment allows the authentication to be performed quickly depending on the type of authentication.

Since the signature registration (FIG. 4A) remains unchanged from that in the first embodiment, the signature authentication only is discussed here.

Figure 3:
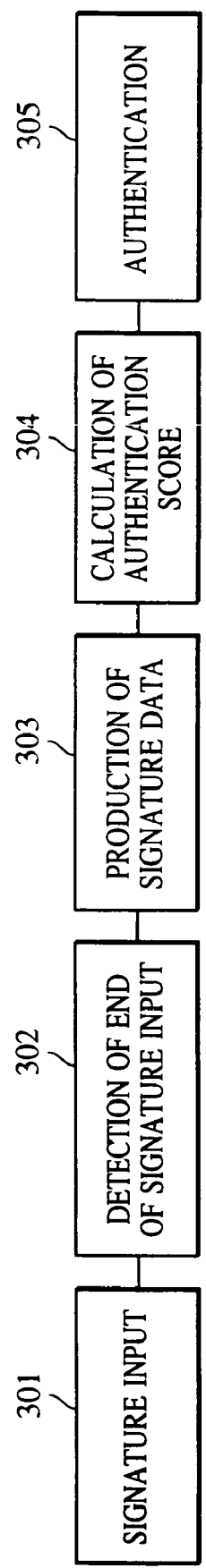
FIG. 3 is a schematic diagram showing the concept of a signature authentication process of a second embodiment of the present invention.

FIG. 3 shows the concept of the signature authentication process of the second embodiment.

Referring to FIG. 3, as in the first embodiment, the second embodiment utilizes a signature input block 301, a signature input end detection block 302, and a signature data production block 303.

In an authentication score calculation block 304, signature data registered is compared with input signature data, and the degree of similarity therebetween is calculated as a score.

In an authentication block 305, a determination is made of whether the calculated score exceeds a predetermined threshold level.

The second embodiment has no equivalent to the highest score calculation block 107 (FIG. 1B) in the first embodiment.

FIGS. 4A and 4B show in detail the process in the second embodiment, wherein FIG. 4A is a flow diagram showing a signature registration process, and FIG. 4B is a flow diagram showing a signature authentication process. The process in FIG. 4A remains unchanged from the signature registration process in the first embodiment and the discussion thereof is not repeated here. The signature authentication process shown in FIG. 4B is performed as follows.

In step S411, the device waits for the input of a signature for authentication with variables used in a buffer initialized.

In step S412, the signature is input.

In step S413, authentication data to be compared with signature data (dictionary data) registered in a dictionary is produced when the signature inputting ends.

In step S414, a variable i is initialized (i=1).

In step S415, the authentication data produced in step S413 is compared with the i-th signature data registered in the dictionary, and a score indicating the degree of similarity is calculated.

In step S416, a check is made to see if the calculated score has the degree of similarity higher than that of a predetermined threshold. If the calculated score is higher, the process goes to step S417, and the authentication is deemed successful. If not, the process goes to steps S418, S420, and S415, and the authentication data is compared with the (i+1)-th signature data. The score indicating the degree of similarity is calculated, and compared with the threshold. This process is repeated.

When the authentication data is compared with the n-th signature data, and fails to be authenticated, the process proceeds to steps S418 and S419. An unsuccessful authentication results.

In the flow of the process, the second embodiment determines whether the score exceeds the threshold, each time the score indicating the degree of similarity is calculated. When an earlier one of the dictionary data is found to have a high degree of similarity, successfully authenticating the signature data, a small number of calculations works.

Since the calculation of the score requires the largest amount of calculation (i.e., calculation time) in the authentication process, a smaller number of score calculations contributes to fast calculation, thereby leading to a fast authentication process.

In accordance with the first and second embodiments, the input signature data is compared with the plurality of pieces of the authentication signature data (dictionary data). If at least one of the plurality of the pieces of the authentication signature data successfully authenticates the input signature data, the authentication is deemed successful. Even if there are variations in the input signatures, the signature authentication is reliably performed.

The matching between the input signature data and the authentication signature data is calculated in a score, and based on the calculated score, the authentication is determined to be successful or unsuccessful. Thus, the comparison and authentication are easily performed.

The matching between the input signature data and the authentication signature data is calculated in a score, and based on the highest score of the plurality of the calculated scores, the authentication is determined to be successful or unsuccessful. Thus, the number of determination processes for determining the authentication to be a success or failure is reduced.

The matching between the input signature data and the authentication signature data is calculated in a score, and a determination is made of whether the authentication is successful based on the calculated score, each time the score is calculated. When an earlier score is found to have a high degree of similarity, successfully authenticating the signature data, a small number of calculations works.

Since a plurality of pieces of the input authentication signature data is stored as individual authentication data in the storage unit, the user does not need to input signatures having a high correlation during the registration of the signature. The user thus enjoys an easy registration environment. If the signature input during the authentication has a high correlation with any one of the registered signatures, the signature input is successfully authenticated. The threshold value serving as a criterion for the determination of successful or unsuccessful authentication is set to be rigorous. The criterion level for authenticating the signature of a person is thus raised for higher accuracy.

Third Embodiment

When the user forgets the signature registered as the dictionary data in the first and second embodiments, a reregistration of the signature is required to use the information terminal again. However, if the reregistration of the signature is easy, someone else may easily modify the signature in the information terminal, which might be stolen, and may easily monitor the sensitive information stored in the information terminal. Discussed next is a third embodiment which enables the user to reregister the signature without any risk that someone else monitors the sensitive information stored in the portable information terminal such as a computer.

The third embodiment may be incorporated in the information processing terminal such as the portable information terminal shown in FIG. 6A through FIG. 7.

In the portable information terminal of the third embodiment, the sensitive information such as user information is stored in a file system in the flash memory 708 of the portable information terminal.

The portable information terminal of the third embodiment has means for allowing the user to authenticate the handwriting to reference or overwrite the sensitive information. The signature is input to the screen 602 using the digitizer 602 and the pen, and the signature is compared with the pre-registered signature in the dictionary of the flash memory 708 for authentication.

Like the sensitive information, the signature dictionary is stored in the file system in the flash memory 708 of the portable information terminal.

Figure 10:
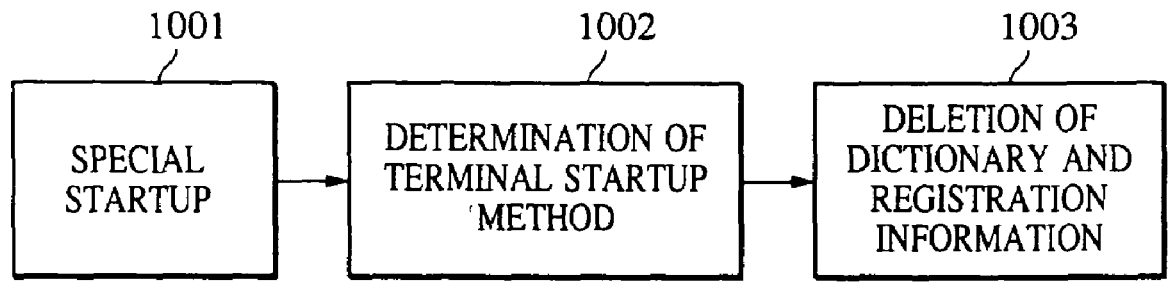
FIG. 10 diagrammatically shows a third embodiment of the present invention.
Figure 11:
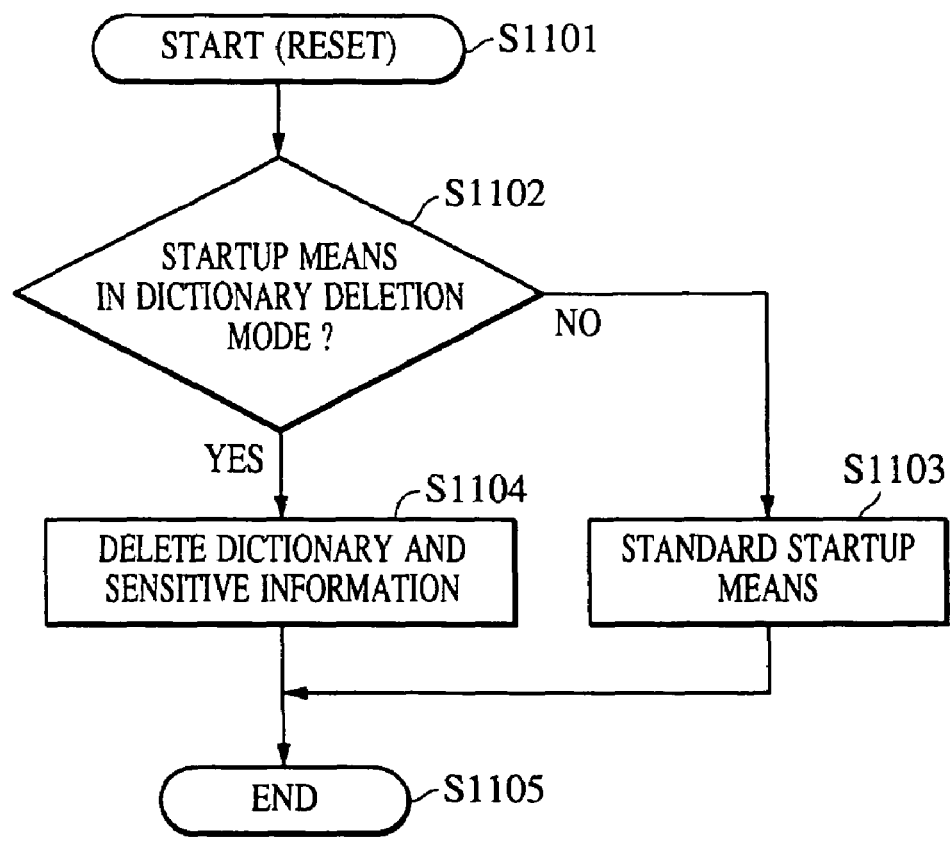
FIG. 11 is a flow diagram showing the process of the third embodiment of the present invention.

FIG. 10 generally illustrates the process of the third embodiment, and FIG. 11 is a flow diagram of the process flow of the third embodiment.

Referring to FIG. 10, the third embodiment is a portable information terminal which determines in a terminal startup method determination block 1002 that a special terminal startup is performed when a special terminal startup 1001 is initiated, and deletes the dictionary and the registered information in a dictionary and registration information deletion block 1003.

As shown in FIG. 11, the portable information terminal 601 is reset in step S1101.

When the user presses a center reset button 604 from among hardware buttons 603-605 while pressing the reset button 606 at the same time, the computer performs an internal process at the restart thereof, thereby setting a flag indicating that the computer is restarted with the center button 604 pressed.

In step S1102, at the restart, a determination is made of whether the startup flag is set. If the startup flag is set, the terminal is determined to be in a dictionary deletion mode. If the startup flag is not set, the terminal is determined to not be in the dictionary deletion mode.

When it is determined in step S1102 that the terminal is not in the dictionary deletion mode, the process goes to step S1103. The portable information terminal is initiated in a standard state, and performs the signature authentication process in the first embodiment shown in FIG. 2B or the signature authentication process in the second embodiment shown in FIG. 4B.

On the other hand, when it is determined in step S1102 that the terminal is in the dictionary deletion mode, the process goes to step S1104. The file system containing registered signature dictionary data and the sensitive data is erased.

When the terminal is initiated in the dictionary deletion mode as described above, the file system is erased, the dictionary for the hand-written signature authentication is deleted, and the sensitive information is also deleted at the same time. The signature registration process of the first embodiment shown in FIG. 2A now starts over.

If a user other than the registered owner attempts to reference the sensitive information in the portable information terminal, that user cannot reference the sensitive information without a successful authentication. Furthermore, if someone else attempts to use the portable information terminal by deleting the signature dictionary, the sensitive information is deleted together with the signature dictionary. Confidentiality of the sensitive information is thus protected.

When the owner of the portable information terminal forgets the signature, the owner can erase the file system and then register the signature in the dictionary again.

In this way, the dictionary for the hand-written signature authentication is reregistered while the confidentiality of the information is protected.

Fourth Embodiment

Figure 12:
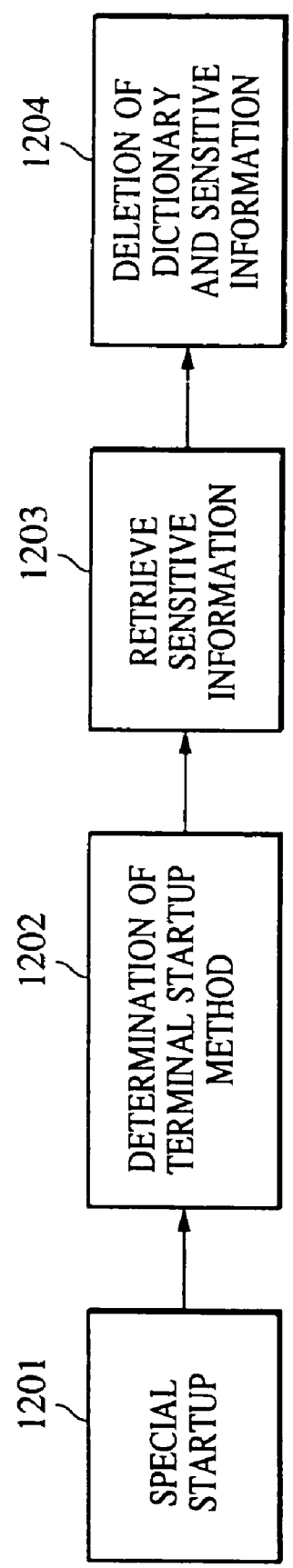
FIG. 12 diagrammatically shows a fourth embodiment of the present invention.
Figure 13:
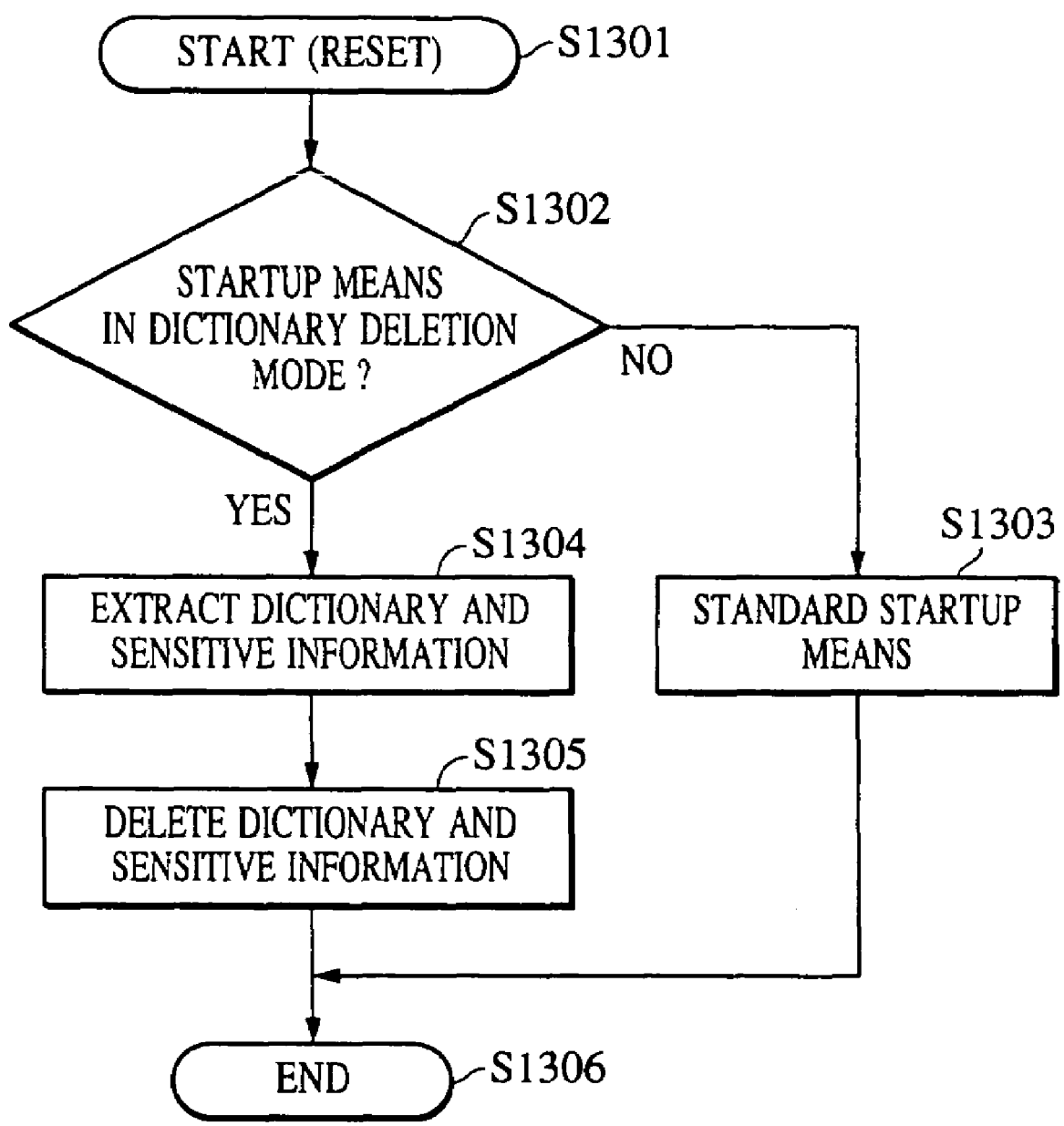
FIG. 13 is a flow diagram showing the process of the fourth embodiment of the present invention.

A fourth embodiment of the present invention is now discussed, referring to FIG. 12 and FIG. 13.

Like the first embodiment, the fourth embodiment may be incorporated in the information processing apparatus such as the portable information terminal shown in FIG. 6A through FIG. 7.

In the fourth embodiment, each piece of information stored in the file system of the flash memory 708 has at least one attribute indicating whether the information is confidential.

Specifically, each file in the file system has an attribute indicating sensitive information, and depending on whether the attribute is set, the information is discriminated between sensitive information and ordinary and non-sensitive information.

FIG. 12 shows the process in the fourth embodiment, and FIG. 13 is a flow diagram of the fourth embodiment.

Referring to FIG. 12, the fourth embodiment is a portable information terminal that determines in a terminal startup determination method 1202 that a special startup is performed in a special terminal startup block 1201, retrieves sensitive information in a sensitive information retrieval block 1203, and erases the dictionary information and the retrieved sensitive information in a sensitive information deletion block 1204.

Referring to FIG. 13, the portable information terminal 601 is reset when a reset button 606 is pressed, in step S1301.

When the reset button 606 is pressed while a center button 604 from among hardware buttons 603-605 is pressed at the same time, the computer performs an internal process at the restart thereof, thereby setting a flag indicating that the computer is reset (restarted) with the center button 604 pressed.

In step S1302, at the restart, a determination is made of whether the startup flag is set. If the startup flag is set, the terminal is determined to be in a dictionary deletion mode. If the startup flag is not set, the terminal is determined to not be in the dictionary deletion mode.

When it is determined in step S1302 that the terminal is not in the dictionary deletion mode, the process goes to step S1303. The portable information terminal is initiated in a standard state, and performs the signature authentication process.

On the other hand, when it is determined in step S1302 that the terminal is in the dictionary deletion mode, the process goes to step S1304. A CPU 601 searches for an attribute indicating sensitive information in all pieces of information stored in the file system of the flash memory 708, and retrieves the information having this attribute set.

In step S1305, the signature dictionary and the retrieved information to be erased are deleted, and the reregistration process of the signature starts over.

As discussed above, the terminal deletes only information having confidentiality, rather than deleting all information stored in the file system. Non-confidential information remains unerased.

The amount of information to be deleted is minimized, and the dictionary for the hand-written signature authentication is reregistered while the confidentiality of the information is assured.

When the owner of the portable information terminal forgets the signature, the owner can register the dictionary for the authentication signature again by deleting the file system. The information requiring no confidentiality remains unerased, and it suffices to re-enter the sensitive information only.

Fifth Embodiment

In the third and fourth embodiments, the signature dictionary and information (registration information and sensitive information) are deleted when the reset button 606 is pressed while the center button 604 is being pressed. Alternatively, the deletion may be performed at a start with predetermined buttons pressed, rather than at a restart.

In accordance with the third through fifth embodiments, the hand-written signature authentication device includes the storage unit for storing the user information and the authentication information for authenticating the signature input through hand-writing, and the plurality of the startup units for starting up the hand-written signature authentication device. The hand-written signature authentication device judges which state to take in the startup thereof, by determining whether the startup is initiated by the predetermined startup unit of the plurality of the startup units.

When it is determined that the predetermined startup unit performs the startup, the signature information and the user information are deleted to allow the signature to be reregistered. If someone else attempts to reregister a signature to monitor the information, the information is deleted, and the confidentiality of the information is protected.

A determination is made whether the user information is sensitive information. When it is determined that the user information is sensitive information, the signature information and the user information determined to be the sensitive information are deleted. The confidentiality of the information is thus protected. When the owner forgets the signature himself or herself, information other than the sensitive information remains unerased, and it suffices to re-enter the sensitive information only to revert back to the standard state.

Sixth Embodiment

In accordance with the first through fifth embodiments, a hand-written signature authentication program is stored in the ROM 707 or the flash memory 708. Alternatively, the portable information terminal may come supplied with a storage medium (such as a flash memory detachable to the portable information terminal) in which a hand-written signature authentication program may be stored. The CPU 701 reads the hand-written signature authentication program from the storage medium, thereby executing the program.

The present invention may be implemented by supplying a hand-written authentication program from an external program transmitting device through a network and the communication interface 704, and the CPU 701 executes the hand-written authentication program. In this case, program codes transmitted from the transmitting device implement the preceding embodiments, and the transmitting device transmitting the program codes constitutes the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signature authentication device, comprising:
storage means for storing a plurality of pieces of authentication signature data for one single user;
input means for inputting signature data;
authenticator means for determining that the input signature data is successfully authenticated if a comparison between the input signature data and at least one piece of the plurality of pieces of authentication signature data is successful;
startup determination means for determining whether predetermined startup means from among a plurality of startup means has performed a startup; and
deleting means for deleting predetermined information when it is determined that the startup has been performed by the predetermined startup means.

2. A signature authentication method, comprising:
an input step of inputting signature data;
an authentication step of determining that the input signature data is successfully authenticated when a comparison between the input signature data and at least one piece of a plurality of pieces of authentication signature data is successful;
a startup determination step of determining whether predetermined startup means from among a plurality of startup means has performed a startup; and
a deleting step of deleting predetermined information when it is determined that the startup has been performed by the predetermined startup means.

3. A computer program product stored on a computer-readable medium for authenticating a signature, comprising computer-executable code for performing:
an input step of inputting signature data; and
an authentication step of determining that the input signature data is successfully authenticated if a comparison between the input signature data and at least one piece of a plurality of pieces of authentication signature data is successful;
a startup determination step of determining whether predetermined startup means from among a plurality of startup means has performed a startup; and
a deleting step of deleting predetermined information when it is determined that the startup has been performed by the predetermined startup means.

4. A signature authentication device, comprising:
storage means for storing user information and signature information for authenticating a signature input through hand-writing;
a plurality of startup means for starting up the signature authentication device;
startup determination means for determining whether predetermined startup means from among the plurality of startup means has performed a startup; and
deleting means for deleting the signature information and the user information when it is determined that the startup has been performed by the predetermined startup means.

5. A signature authentication device according to claim 4, further comprising sensitive information determination means for determining whether the user information contains sensitive information,
wherein the deleting means deletes the signature information and the sensitive information when it is determined that the startup has been performed by the predetermined startup means.

6. A signature authentication device according to claim 4, wherein the predetermined startup means is means for restarting the signature authentication device.

7. A signature authentication device according to claim 4, wherein the startup determination means determines that the startup has been performed by the predetermined startup means when the startup is initiated by a predetermined combination of buttons.

8. A signature authentication method for controlling a signature authentication device having storage means for storing user information and signature information for authenticating a signature input through hand-writing and having a plurality of startup means for starting the signature authentication device, the method comprising:
a startup determination step of determining whether a startup has been performed by predetermined startup means from among the plurality of startup means; and
a deleting step of deleting the signature information and the user information when it is determined in the startup determination step that the startup has been performed by the predetermined startup means.

9. A signature authentication method according to claim 8, further comprising a sensitive information determination step of determining whether the user information contains sensitive information,
wherein the deleting step deletes the signature information and the sensitive information when it is determined that the startup has been performed by the predetermined startup means.

10. A signature authentication method according to claim 8, wherein the predetermined startup means is means for restarting the signature authentication device.

11. A signature authentication method according to claim 8, wherein the startup determination step determines that the startup has been performed by the predetermined startup means when the startup is initiated by a predetermined combination of buttons.

12. A computer-readable computer program product stored on a computer-readable medium for controlling a signature authentication device having storage means for storing user information and signature information for authenticating a signature input through hand-writing and having a plurality of startup means for starting the signature authentication device, the computer program product comprising computer-executable code for performing:
a startup determination step of determining whether a startup has been performed by predetermined startup means from among the plurality of startup means; and
a deleting step of deleting the signature information and the user information when it is determined that the startup has been performed by the predetermined startup means in the startup determination step.

13. A computer program product according to claim 12, further comprising computer-executable code for performing a sensitive information determination step of determining whether the user information contains sensitive information,
wherein the deleting step deletes the signature information and the sensitive information when it is determined that the startup has been performed by the predetermined startup means.

14. A computer program product according to claim 12, wherein the predetermined startup means is means for restarting the signature authentication device.

15. A computer program product according to claim 12, wherein the startup determination step determines that the startup has been performed by the predetermined startup means when the startup is initiated by a predetermined combination of buttons.

16. A computer program product according to claim 12, wherein the computer program product is directly loadable into the internal memory of a computer.

17. A signature authentication device, comprising:
a memory storing a plurality of pieces of authentication signature data for one single user;
an input device for inputting signature data; and
a processor that compares the input signature data with each piece of the plurality of pieces of authentication signature data and determines that the input signature data is successfully authenticated when a comparison between the input signature data and at least one piece of the plurality of pieces of authentication signature data is successful,
wherein the processor determines whether a predetermined startup mode from among a plurality of startup modes has been used for starting up the signature authentication device, and wherein the processor deletes predetermined information when it determines that the startup has been performed by the predetermined startup mode.

18. A signature authentication device, comprising:
authentication data input means for repeatedly inputting the same user's signature to obtain a plurality of signatures of that user;
registration means for registering in storage means a plurality of pieces of authentication signature data, each piece corresponding to a respective one of the signatures input by said authentication data input means;
signature data input means for inputting signature data;
authenticator means for determining that the input signature data is successfully authenticated if a comparison between the input signature data and at least one piece of the plurality of pieces of authentication signature data is successful;
startup determination means for determining whether predetermined startup means from among a plurality of startup means has performed a startup; and
deleting means for deleting predetermined information when it is determined that the startup has been performed by the predetermined startup means.

19. A signature authentication method comprising:
an authentication data input means for repeatedly inputting the same user's signature to obtain a plurality of signatures of that user;
a registration step of registering in storage means a plurality of pieces of authentication signature data, each piece corresponding to a respective one of the signatures input in the authentication data input step;
a signature data input step of inputting signature data;
an authentication step of determining that the input signature data is successfully authenticated when a comparison between the input signature data and at least one piece of the plurality of pieces of authentication signature data is successful;
a startup determination step of determining whether predetermined startup means from among a plurality of startup means has performed a startup; and
a deleting step of deleting predetermined information when it is determined that the startup has been performed by the predetermined startup means.

20. A computer-readable computer program product stored on a computer-readable medium for authenticating a signature, comprising computer-executable code for performing:
an authentication data input step for repeatedly inputting the same user's signature to obtain a plurality of signatures of that user;
a registration step of registering in storage means a plurality of pieces of authentication signature data, each piece corresponding to a respective one of the signatures input in the authentication data input step;
a signature data input step of inputting signature data; and
an authentication step of determining that the input signature data is successfully authenticated if a comparison between the input signature data and at least one piece of the plurality of pieces of authentication signature data is successful;
a startup determination step of determining whether predetermined startup means from among a plurality of startup means has performed a startup; and
a deleting step of deleting predetermined information when it is determined that the startup has been performed by the predetermined startup means.

21. A signature authentication device, comprising:
an authentication data input device for repeatedly inputting the same user's signature to obtain a plurality of signatures of that user;
a registration unit for registering in a memory a plurality of pieces of authentication signature data, each piece corresponding to a respective one of the signatures input by said authentication data input device;
a signature data input device for inputting signature data; and
a processor that compares the input signature data with each piece of the plurality of pieces of authentication signature data and determines that the input signature data is successfully authenticated when a comparison between the input signature data and at least one piece of the plurality of pieces of authentication signature data is successful,
wherein the processor determines whether a predetermined startup mode from among a plurality of startup modes has been used for starting up the signature authentication device, and wherein the processor deletes predetermined information when it determines that the startup has been performed by the predetermined startup mode.

* * * * *